Oct. 9, 1945.  G. A. LYON  2,386,234
WHEEL STRUCTURE
Filed June 21, 1943  2 Sheets-Sheet 1
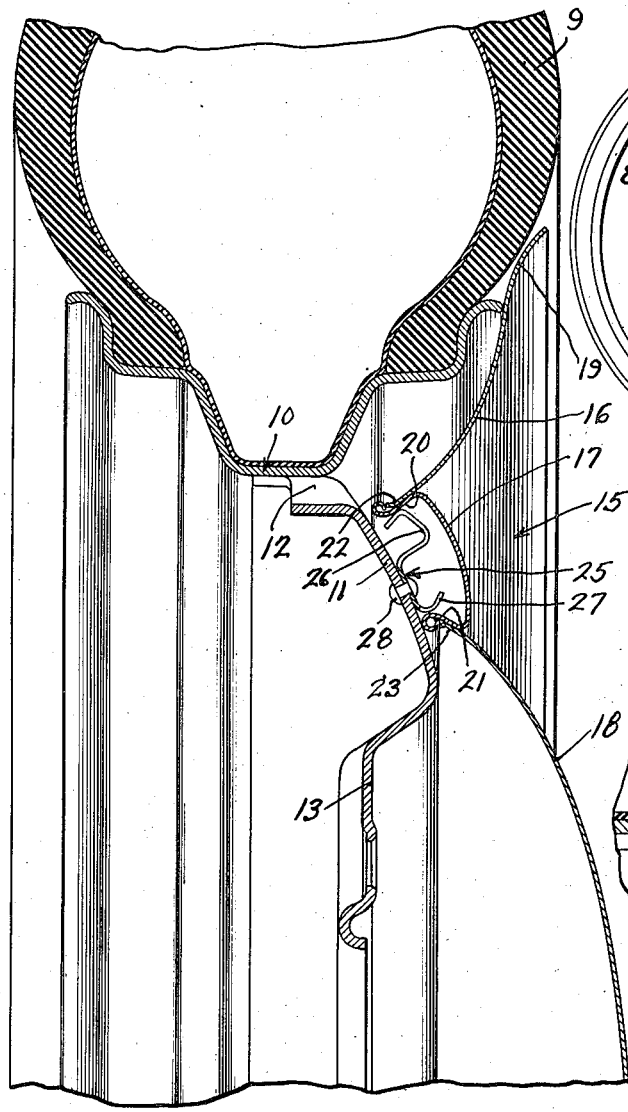
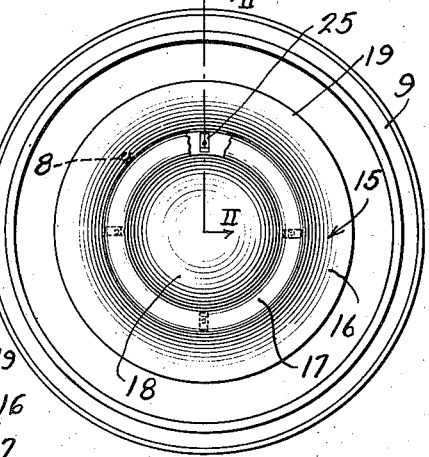
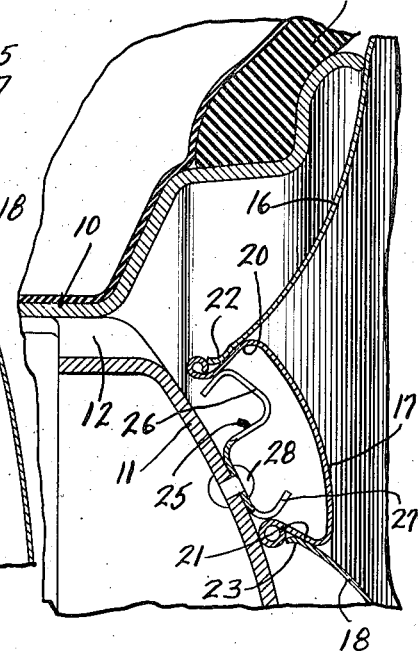
Inventor
GEORGE ALBERT LYON.
by Charles W. Hills Attys.

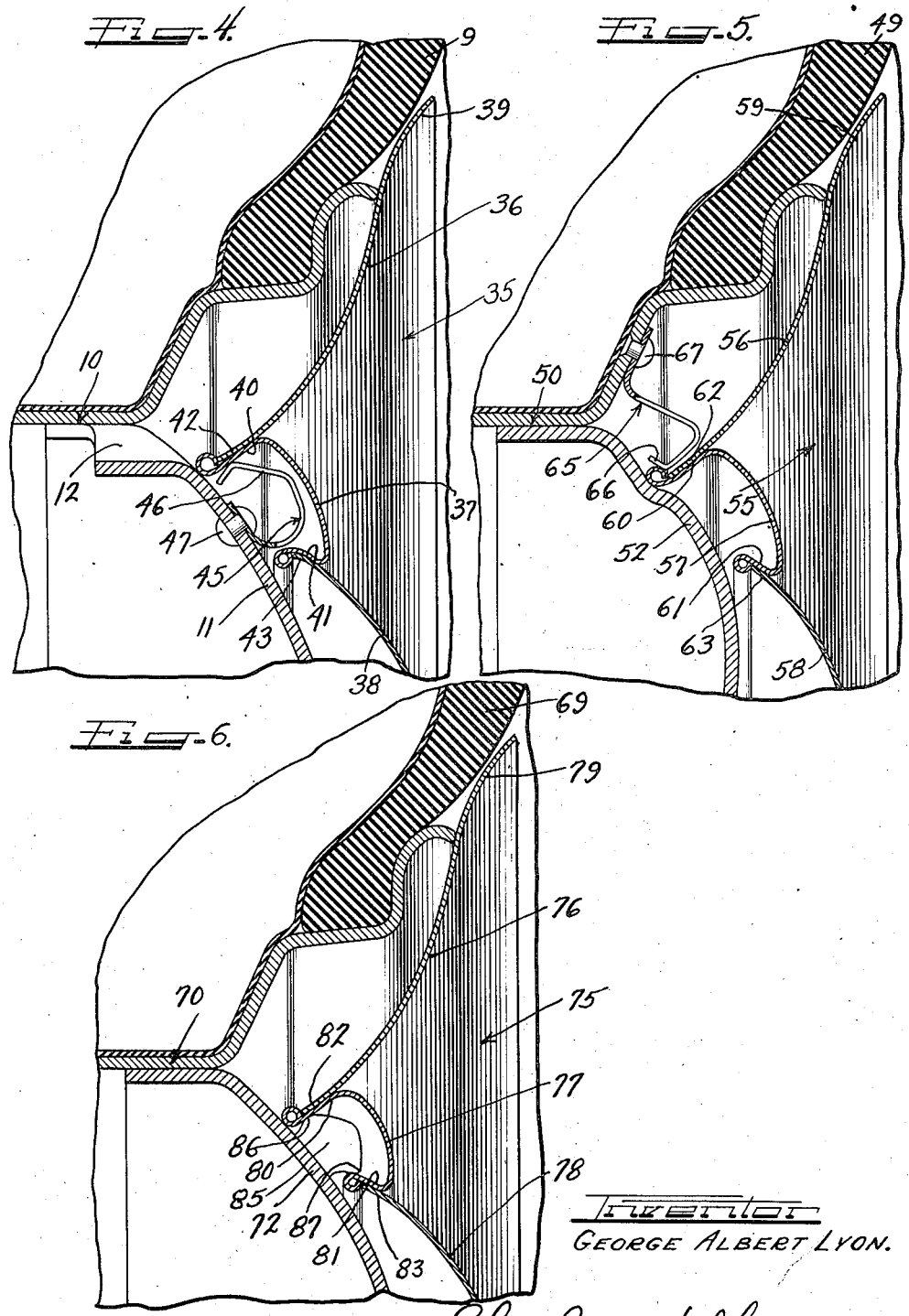

Patented Oct. 9, 1945

2,386,234

UNITED STATES PATENT OFFICE 2,386,234

WHEEL STRUCTURE

George Albert Lyon, Allenhurst, N. J.

Application June 21, 1943, Serial No. 491,602

11 Claims. (Cl. 301—37)

This invention relates to a wheel structure and more particularly to a multi-part wheel cover and novel retaining means on the wheel for holding the parts on the wheel.

An object of this invention is to provide a simple means on a wheel for retaining a plurality of parts of a wheel cover on the wheel in proper centered and concentric relation.

Another object of this invention is to provide novel cover retaining means cooperable with an intermediate member to which trim ring and central cover parts are attached.

In accordance with the general features of this invention there is provided in a wheel structure including a multi-flanged tire rim part for receiving a tire and a wheel body part attached thereto, an annular trim ring member for covering the rim, a concentric circular central cover member for the wheel body, an intermediate annular bead having inner and outer under-turned portions; the trim ring being held on said outer portion and the central member being held on the inner portion, there also being provided means attached to one of the wheel parts over which at least one of said under-turned portions is resiliently snapped to retain the entire assembly on the wheel.

Another feature of the invention relates to the forming of the attaching means of the above noted assembly so that it presents a plurality of oppositely facing shoulders cooperable with the underturned portions of the intermediate retaining bead of the cover assembly.

A further feature of the invention relates to the positioning of the attaching means so that in addition to performing its function of holding the parts of the cover assembly on the wheel it also aids in centering the parts and holding them in concentric relationship.

The retaining means may take the form of a number of different constructions, one of which embraces only one shoulder for cooperation with the under-turned portion of the intermediate retaining member, another of which embraces a multiple of resilient shoulders for cooperation with both of the under-turned portions of the intermediate retaining bead, and the third of which comprises a plurality of protuberances, each of which has oppositely under-cut shoulders for embracing the under-turned edges of the intermediate bead.

Other objects and features of this invention will more fully appear from the following detail description, taken in connection with the accompanying drawings which illustrate several embodiments thereof and in which Figure 1 is a side elevation of a wheel structure embodying the features of this invention in which the cover is partly broken away to show one of the spring retaining clips;

Figure 2 is an enlarged fragmentary cross-sectional view taken on the line II—II of Figure 1 looking in the direction indicated by the arrows and showing the manner in which the plurality of parts going to make up the cover assembly are held on the wheel by the spring clips attached to one of the wheel parts;

Figure 3 is a fragmentary enlarged cross-sectional view corresponding to an upper right-hand portion of Figure 2;

Figure 4 is an enlarged fragmentary cross-sectional view similar to Figure 3 illustrating a modification of the invention;

Figure 5 is an enlarged cross-sectional view similar to Figure 3 illustrating a modification wherein the spring retaining means is attached to the rim part instead of to the body part of the wheel; and Figure 6 is an enlarged fragmentary cross-sectional view corresponding to Figure 3 wherein the retaining means instead of being in the form of a spring member is in the form of a plurality of protuberances having undercut shoulders arranged to cooperate with the intermediate bead of the cover.

A shown on the drawings:

The reference character 9 designates generally a conventional pneumatic rubber tire having the usual inner tube and valve stem 8 (Figure 1) and which tire is carried in the usual way on a drop-center type of metallic tire rim 10. The tire rim, as is well-known in the art, is of a multiflanged type and includes outer flange surfaces which it is desired to have covered by a wheel cover in the use of the wheel.

The tire rim 10 is connected at spaced intervals in the usual way to a wheel body 11 which comprises a metallic stamping, there being spaced openings 12 between the places of attachment of the body to the rim. These wheel openings provide for the ventilation of the brake drum, as is well known in the art.

The central part of the wheel body or spider part 11 is dished and provided with the usual central bolt-on flange 13 by means of which the wheel may be detachably bolted to the support on an axle as is well known in the art.

Associated with the outer exposed side of the wheel when in use is a wheel cover assembly embodying the features of this invention and which is designated generally by the reference character 15. This wheel cover assembly, or as it is sometimes referred to, wheel trim, embraces an outer annular trim ring 16, an intermediate metallic bead 17 and a central cover member or hub cap 18. The trim ring 16 and the hub cap 18 may be made of any suitable sheet material, but I have attained excellent results by making them of a plastic material which has a high degree of resiliency and yet is self-sustaining with respect to form or shape. I have attained excellent results by making these parts of a thermoplastic material known to the trade as ethylcellulose.

The outer annular trim ring 16 is of such a configuration and depth as to conceal the exposed side flanges of the wheel rim 10 and has an outer turned lip or edge portion 19 which may be manually gripped when it is desired to flex the trim ring 16 away from the rim for the purpose of getting to the valve stem normally concealed thereby. The valve stem is shown in Figure 1 by dotted lines at 8. Also it should be noted at this time that by flexing the trim ring 16 outwardly away from the rim 10 it is possible to insert a pry-off tool therebehind for the purpose of engaging the inner edge of the trim ring to pry the trim ring bead and hub cap off of the retaining means on the wheel.

The central annular bead 17 may be made of any suitable material, although I prefer to make it of a material that has a lustrous external finish such, for example, as stainless steel. It is of a hollow construction and embraces under-turned marginal portions 20 and 21 which are under-turned so as to provide retaining shoulders for the trim ring and the hub cap. The inner edge 22 of the trim ring 16 is slightly turned so that it can be snapped over the under-turned portion 20 of the bead 17. Similarly the hub cap 18 has a slightly turned edge 23 so that it may be snapped over the under-turned portion 21 of the bead 17. It should be noted that the extremities of the bead may be curled if it is so desired so as to serve as abutments for the cooperating turned edges of the trim ring and hub cap as is clearly evident from Figure 3.

In order to retain this assembly on the wheel there is provided in the first embodiment of the invention a plurality of spring clips designated generally by the reference character 25, riveted at 28 to the wheel body 11. While this means is shown in the form of disconnected clips, it is of course to be understood that the same cross-sectional shape could be used and the clips could be formed in a common ring.

Each of the clips embraces oppositely turned inner and outer extremities 26 and 27 which in reality define inverted spring portions over which the turned inner edges of the bead are adapted to be resiliently cammed by the pressing of the cover assembly axially onto the wheel. The resilient pressure exerted by these turned extremities 26 and 27 of the spring clips is such as to hold the cover on the wheel. This is due to the fact that after these extremities 26 and 27 have been cammed inwardly by the pressing of the cover onto the wheel they do not completely return to their initial position so that they are under tension when they are in engagement with the turned edges of the bead 17.

The spring means 25 in addition to retaining the trim ring 16, bead 26 and hub cap 18 on the wheel, also serves the function of centering these parts and holding them in concentric relation on the wheel.

In use, both the trim ring 16 and the hub cap part 18, or either may be applied to the intermediate bead 17 from the rear side thereof prior to the application of the cover assembly to the wheel. In other words, each of these parts is pressed axially outwardly onto the bead so that the edge of the part is resiliently snapped onto the underturned portion of the bead in association therewith.

Before describing the other modifications, it should be noted that I have in some of the modifications used the same numbers as in the first form wherever the parts are identical to those of the first form. In Figure 4 the wheel cover is designated generally by the reference character 35 and embraces an outer trim ring 36, a central bead 37 and a hub cap 38. These parts are of the same general characteristics as the parts of the first-described form and function in substantially the same manner. The ring 36 likewise has a turned outer edge 39.

The principal difference in this modification relates to the construction of the retaining spring 45 which instead of having two loops only has a single loop 46 for embracing the outer underturned edge 40 of the bead 37. This spring clip is attached at 47 to the wheel body 12.

The trim ring 36 has its inner edge 42 snapped over the underturned portion 40 of the bead and the hub cap 38 has its turned edge snapped over the underturned portion 43 of the bead. Otherwise this form of the invention is substantially similar to the previous form.

In Figure 5 the tire 49 is mounted upon the conventional drop-center rim 50 attached to a wheel body 69. Associated with the wheel is a wheel cover assembly 55 embracing a trim ring 56, an intermediate bead 57 and a hub cap 58. This form of the invention, as well as the form shown in Figure 4, has an outer turned edge 59 which is for the same purpose as the turned edge 19 of the first described form of the invention. The parts 56, 57 and 58 of this form of the invention are made similar to the parts of the first form and operate substantially in the same way.

The intermediate bead has an under-turned inner edge 61 cooperable with the turned edge 63 of the hub cap. This bead also has an underturned edge 60 cooperable with the rearwardly turned edge 62 of the trim ring 56.

The retaining means in this case, designated by the reference character 65, instead of being attached to the wheel body is attached at 67 to the rim 50. This retaining means has a turned edge 66 for yieldably engaging the turned outer edge of the bead 57 as well as the turned edge of the trim ring 56 to hold such parts on the wheel and by so doing also holding the hub cap 58 which is detachably mounted on the inner edge of the bead 57.

In the form of the invention illustrated in Figure 6 the tire is designated generally by the reference numeral 69 and is mounted upon the usual drop-center type of tire rim 70 attached to the wheel body or spider 72.

The wheel cover structure is designated generally by the reference character 75 and, as in the other forms of the invention, embraces an outer plastic trim ring 76 and intermediate bead 77 and a plastic central member or hub cap 78. The intermediate bead 70 has an outer under-turned edge portion 80 over which the inner edge 82 of the trim ring is snapped. Also the bead has an under-turned edge 81 over which the outer edge 83 of the hub cap is snapped. It should be noted that in all forms of this invention the trim ring and hub cap parts are applied to the intermediate bead by snapping the same over the cooperating under-turned edges of the bead from the rear side of the bead, and may be used separately or together.

Cooperable with the bead is retaining means 85 in the form of a plurality of protuberances suitably attached or welded to the wheel body 72. Each of these protuberances embodies under-cut opposite edges 86 and 87 over which the under-turned edges 80 and 81 of the bead 77 are adapted to be resiliently sprung when the cover is moved axially onto the wheel. In other words, the bead is cammed onto these protuberances 85 which may be of any suitable number. The natural resiliency of the under-turned portions of the metallic bead 70 serves to hold the bead as well as the trim ring and hub cap parts on the wheel. This form of the invention, like the previous forms, may be removed by flexing the trim ring 76 and inserting a pry-off tool therebehind for the purpose of engaging it under the outer under-turned edge of the bead and prying the same free of the retaining means.

The outer edge 79 of the trim ring 76, as in the previous forms, is slightly turned outward so as not to bind against the tire and so as to provide a lip for manual manipulation. In addition, in all forms a portion of the trim ring radially inward of the lip is adapted to bear against an outermost edge of the wheel tire rim and to snap back inherently into engagement with such edge after each manual flexure of the ring relative to its radially inner support.

In all forms the trim ring and central cover member or hub cap may be used separately or together as desired, with the ornamental supporting lustrous metal bead. The plastic material of such trim rings and hub caps resist permanent indentation or deformation and will spring back to normal shape even after as much as a two-inch denting of same. Then, too, the cover assembly in each form has had its weight decreased as much as two-thirds of that of existing metal hub cap and trim ring structures, thus decreasing materially the unsprung weight of the wheel.

I claim as my invention:

1. In a wheel structure including a multi-flanged rim part for receiving a tire and a wheel body part attached thereto, an annular trim ring member for covering the rim, a concentric central cover member for the wheel body, an intermediate annular bead having inner and outer under-turned portions, said trim ring being resiliently held on said outer portion and said central member being held on said inner portion, and means attached to one of said wheel parts over which one of said under-turned portions is resiliently snapped into retained engagement therewith to retain said bead and said trim ring and said central member on the wheel.

2. In a wheel structure including a multi-flanged rim part for receiving a tire and a wheel body part attached thereto, an annular trim ring member for covering the rim, a concentric central cover member for the wheel body, an intermediate annular bead having inner and outer under-turned portions, said trim ring being resiliently held on said outer portion and said central member being held on said inner portion, and means attached to one of said wheel parts over which one of said under-turned portions is resiliently snapped into retained engagement therewith to retain said bead and said trim ring and said central member on the wheel, said trim ring being made of a plastic material having the physical property of being self-sustaining with regard to shape, and being sufficiently resilient so that any tendency to permanently deform the same is resisted, whereby upon indentation said trim ring will return to its initial position.

3. In a wheel structure including a multi-flanged rim part for receiving a tire and a wheel body part attached thereto, an annular trim ring member for covering the rim, a concentric central cover member for the wheel body, an intermediate annular bead having inner and outer under-turned portions, said trim ring being resiliently held on said outer portion and said central member being held on said inner portion, and means attached to one of said wheel parts over which one of said under-turned portions is resiliently snapped into retained engagement therewith to retain said bead and said trim ring and said central member on the wheel, said trim ring and said circular member each being made of a plastic material having the physical property of being self-sustaining with regard to shape, and being sufficiently resilient so that any tendency to permanently deform the same is resisted, whereby upon indentation said trim ring and said circular member will return to their initial position.

4. In a wheel structure including a multi-flanged rim part for receiving a tire and a wheel body part attached thereto, an annular trim ring member for covering the rim, a concentric central cover member for the wheel body, an intermediate annular bead having inner and outer under-turned portions, said trim ring being resiliently held on said outer portion and said central member being held on said inner portion, and means attached to one of said wheel parts over which one of said under-turned portions is resiliently snapped into retained engagement therewith to retain said bead and said trim ring and said central member on the wheel, said means including under-cut shoulder means behind which one of said underturned portions is adapted to be resiliently pressed as the cover is pressed axially onto the wheel.

5. In a wheel structure including a multi-flanged rim part for receiving a tire and a wheel body part attached thereto, an annular trim ring member for covering the rim, a concentric central cover member for the wheel body, an intermediate annular bead having inner and outer under-turned portions, said trim ring being resiliently held on said outer portion and said central member being held on said inner portion, and spring means attached to one of said parts including a looped end over which one of said under-turned portions is resiliently snapped to detachably retain said bead and said trim ring and said central member on the wheel.

6. In a wheel structure including a multi-flanged rim part for receiving a tire and a wheel body part attached thereto, an annular trim ring member for covering the rim, a concentric central cover member for the wheel body, an intermediate annular bead having inner and outer under-turned portions, said trim ring being resiliently held on said inner portion, and means in the form of a spring having oppositely facing loop portions each defining a shoulder, one shoulder being adapted to have snapped thereover one of said under-turned portions and the other being adapted to have snapped thereover the other of said under-turned portions whereby to hold the bead and trim ring and central member on the wheel.

7. In a wheel structure including a multi-flanged rim part for receiving a tire and a wheel body part attached thereto, an annular trim ring member for covering the rim, a concentric central cover member for the wheel body, an intermediate annular bead having inner and outer under-turned portions, said trim ring being resiliently held on said outer portion and said central member being held on said inner portion, and means comprising a plurality of circumferentially spaced spring clips each embracing oppositely turned portions, one of which being formed to engage the outer underturned portion of the bead to hold the bead and trim ring on the wheel, and the other being arranged to engage the inner underturned portion of the bead to hold the bead and central member on the wheel.

8. In a wheel structure including a multi-flanged rim part for receiving a tire and a wheel body part attached thereto, an annular trim ring member for covering the rim, a concentric central cover member for the wheel body, an intermediate annular bead having inner and outer under-turned portions, said trim ring being resiliently held on said outer portion and said central member being held on said inner portion, and means comprising a plurality of spring clips attached to the wheel body formed to resiliently engage the underturned portions of said bead when the bead is pressed axially thereon and to center the trim ring and central member on the wheel as well as to hold the trim ring, bead and central member on the wheel.

9. In a wheel structure including a multi-flanged rim part for receiving a tire and a wheel body part attached thereto, an annular trim ring member for covering the rim, a concentric central cover member for the wheel body, an intermediate annular bead having inner and outer under-turned portions, said trim ring being resiliently held on said outer portion and said central member being held on said inner portion, and means attached to one of said wheel parts over which one of said under-turned portions is resiliently snapped into retained engagement therewith to retain said bead and said trim ring and said circular member on the wheel, said trim ring and said circular member being made of a relatively thin plastic material which is self-sustaining with regard to form and resiliently deflectable and yet resistant to permanent deformation, and said bead comprising a metal bead of hollow configuration disposed between the junction of said trim ring and central member so as to conceal the joint therebetween and to rigidify the ensuing assembly.

10. In a wheel structure including tire rim and body parts, an annular bead having underturned inner and outer edges, means attached to one of said parts having a shoulder for telescoping cooperation with said bead and over which one of said edges is adapted to be resiliently cammed by axially pressing said bead against the wheel whereby to retain said bead on the wheel, and a wheel trim assembly including a plurality of circular trim members each having a circular edge resiliently snapped over the outside of one of said respective turned edges so as to be retained on said wheel by said bead.

11. In a wheel structure including tire rim and body parts, an annular bead having underturned inner and outer edges, means attached to one of said parts having a shoulder for telescoping cooperation with said bead and over which one of said edges is adapted to be resiliently cammed by axially pressing said bead against the wheel whereby to retain said bead on the wheel, and a wheel trim member having a circular edge resiliently snapped over the outside of one of said turned edges so as to be retained on said wheel by said bead, said trim member being applicable to the bead from the rear side of the same prior to the attachment of the bead to the wheel.

GEORGE ALBERT LYON.